United States Patent
Akano

(10) Patent No.: US 7,023,382 B1
(45) Date of Patent: Apr. 4, 2006

(54) POSITIONING SIGNAL TRANSMISSION APPARATUS

(75) Inventor: Hiroki Akano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/014,787

(22) Filed: Dec. 20, 2004

(30) Foreign Application Priority Data

Sep. 17, 2004 (JP) ............................. 2004-271058

(51) Int. Cl.
*G01S 1/08* (2006.01)

(52) U.S. Cl. ............ 342/386; 342/357.06; 342/357.09; 701/213

(58) Field of Classification Search ........... 342/357.01, 342/357.06, 357.05, 386; 701/207, 213
See application file for complete search history.

(56) References Cited

U.S. PATENT DOCUMENTS

| 5,043,736 A | * | 8/1991 | Darnell et al. | ........... | 342/357.1 |
| 6,104,978 A | * | 8/2000 | Harrison et al. | ............ | 701/207 |
| 6,404,352 B1 | * | 6/2002 | Ichikawa et al. | ........... | 340/988 |
| 6,839,024 B1 | * | 1/2005 | Spilker et al. | .............. | 342/386 |
| 2002/0089722 A1 | * | 7/2002 | Perkins et al. | .............. | 359/155 |
| 2005/0030229 A1 | * | 2/2005 | Spilker, Jr. | .................. | 342/385 |

FOREIGN PATENT DOCUMENTS

| JP | 7-280917 | 10/1995 |
| JP | 2000-111648 | 4/2000 |
| JP | 2003-57330 | 2/2003 |

* cited by examiner

*Primary Examiner*—Dao Phan
(74) *Attorney, Agent, or Firm*—Staas & Halsey LLP

(57) ABSTRACT

A reception high-frequency unit receives a GPS signal transmitted from a satellite configuring GPS. A signal generation unit generates a plurality of pseudo random noise codes that are used for the positioning operation by a positioning apparatus for implementing a positioning operation based on the GPS signal and that are in the same form as that of the GPS signal. A transmission high-frequency unit generates and transmits based on the pseudo random noise codes, a positioning signal in the same form as that of the GPS signal. A transmission control unit controls the transmission high-frequency unit in such a way that a time difference based on the GPS signal received by the reception high-frequency unit is assigned to each positioning signal and the thus-assigned positioning signal is transmitted.

23 Claims, 11 Drawing Sheets

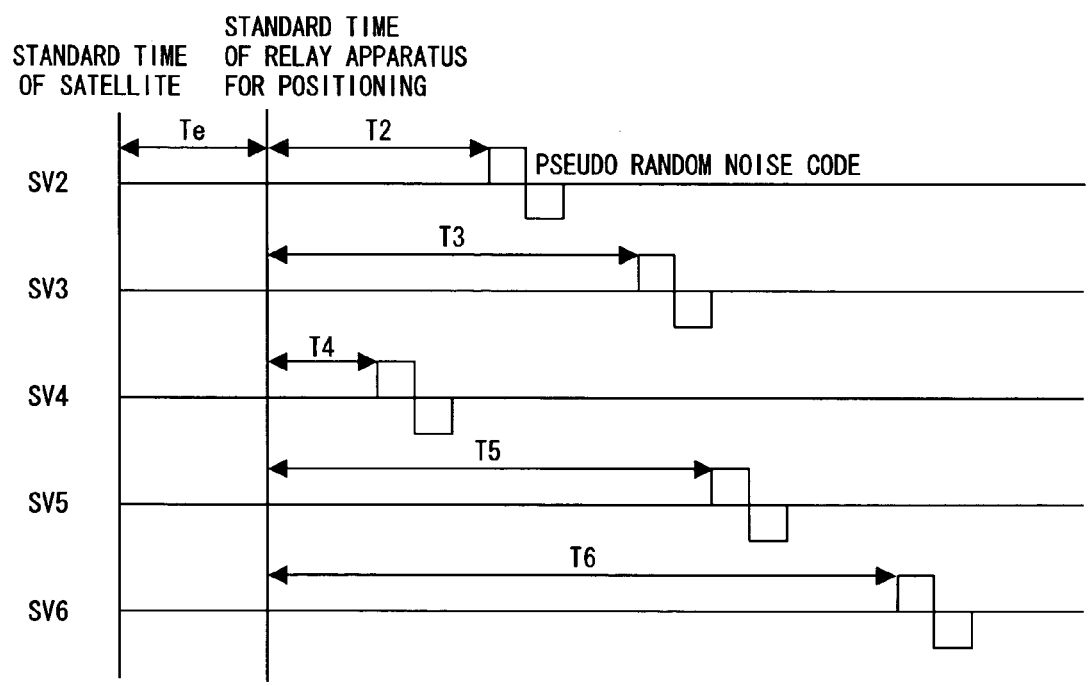
F I G. 5

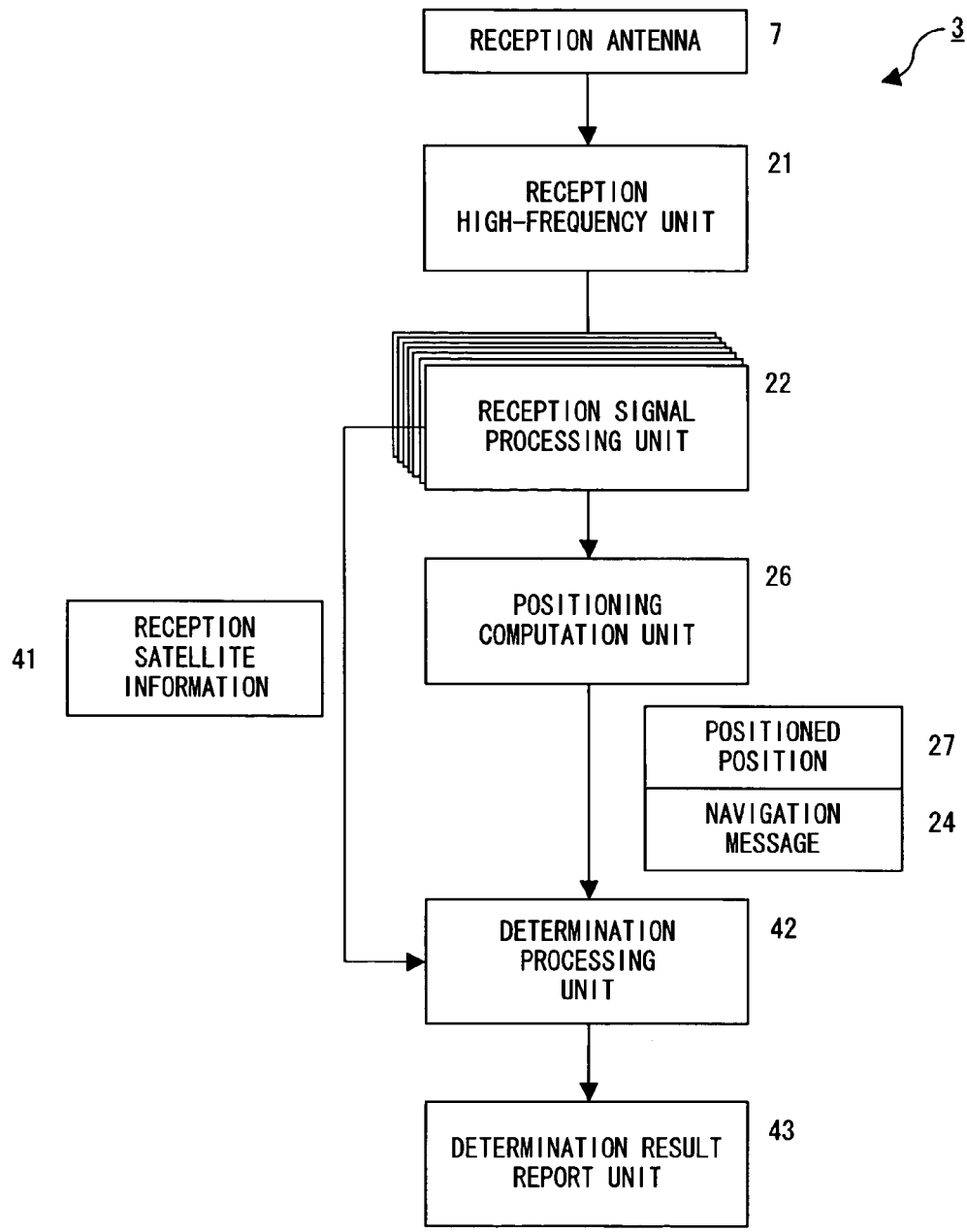
F I G. 8

POSITIONING SIGNAL TRANSMISSION APPARATUS

BACKGROUND OF THE INVENTION

1. Field of the Invention

The present invention is related to a technology of positioning a position using a radio signal. Especially, it is related to a technology of improving the convenience when the position of a mobile station is positioned using a global positioning system (GPS)

2. Description of the Related Art

Recently, an apparatus with a position-positioning function using GPS has become more and more widespread.

A GPS receiver (GPS positioning apparatus) for the position-positioning using a radio signal (hereinafter, referred to as "GPS signal") that is transmitted from a satellite configuring the GPS has a system for the position-positioning at two or more dimensions with high accuracy using signals transmitted from, for example, three or more satellites from among the signals transmitted from about twenty-four satellites circulating around the earth. This GPS technology is also used in car navigation systems and PDAs (Personal Digital Assistant: portable type information communication devices for individual users). According to this technology, the position-positioning of a mobile station or a user is implemented.

Since the GPS receiver implements the position-positioning using a GPS signal, preferable position-positioning cannot be theoretically implemented in such an environment where the line-of-sight between a satellite and a mobile station (GPS receiver) is interfered. Accordingly, a mobile station cannot position its own position in a space which is not exposed to the sky, for example, indoors, in cars or the like and where a GPS signal cannot be directly received (hereinafter, referred to as a GPS signal non-receipt area) in a mobile station. Here, the sky indicates a range of about ±90 degrees to the zenith of a mobile station. Furthermore, the fact that a satellite exists in the sky indicates that the satellite exists (can be seen) in about ±90 degrees to the zenith of a mobile station if there is no obstacle in the way.

Regarding this technology, Japanese patent application laid-open publication No. 2000-111648 (hereinafter, referred to as [document 1]) discloses a technology such that a position ID oscillator for emitting infrared rays signal including position ID is provided indoors and a mobile station is configured to receive the radio wave from a satellite outdoors while it receives the infrared rays signal indoors, thereby enabling the position-positioning of a mobile station irrespective of whether the mobile station is indoors or outdoors.

In Japanese patent application laid-open publication No. 2003-57330 (hereinafter, referred to as [document 2]) discloses a technology of specifying the present position of a mobile station that is moving in a GPS signal non-receipt area by re-radiating a GPS signal to the GPS signal non-receipt area indoors, etc. and by radiating the pre-stored latitude and longitude data to this area using a position data transmission apparatus.

The following is the explanation of the outline of the positioning method using a GPS receiver.

A GPS receiver receives a GPS signal that is transmitted from a plurality of satellites with the same frequency. Each satellite generates a GPS signal based on a diffuse spectrum communication system using a pseudo random noise code having different code arrays. Therefore, the GPS receiver can receive and process with the same frequency the GPS signals that are transmitted from a plurality of satellites. Then, the GPS receiver calculates the attainment time of a signal from each satellite on the basis of the time when this pseudo random noise code is received. Meanwhile, the pseudo random noise code includes a C/A cord and a P cord (Y cord) that is kept confidential in order to restrict a user. The code that is generally disclosed is only C/A cord.

Furthermore, the GPS signal includes a navigation message in which the orbit information (ephemeris), the calendar (almanac), etc. of the satellite is shown together with the pseudo random noise code.

The almanac indicates orbit information about the outlines of all the satellites other than its own satellite that configure GPS, that is, the timetable of satellites. Accordingly, this information is used for determining a satellite that can be acquired by the GPS receiver. On the other hand, the ephemeris shows the exact position of its own satellite and it is this important information that is needed to calculate the position of a mobile station. The GPS receiver calculates the distance from each satellite using the attainment time of the signal from each satellite and then calculates the own position using those distances (at least three distances) and the orbit information about the satellites.

Furthermore, before receiving the GPS signal and starting the position-positioning, the GPS receiver selects the satellite that can be acquired during that period of time on the basis of the almanac received in the past. Subsequently, the GPS receiver implements a search operation for acquiring the signal from a satellite while subtly changing the clock frequency of the GPS receiver. This search operation usually requires several to several tens of seconds. However, in the case where the received almanac becomes old since the GPS receiver has not been used for a long time or in the case where the GPS receive is moved from the position where the positioning operation is previously implemented to the position that is far from the previous position, it takes a longer time since the GPS receiver automatically implements operations for acquiring all the satellites (it takes longer than twelve minutes and thirty seconds to receive all the almanacs).

Accordingly, in the case where the power of the GPS receiver is on and the almanac is kept old and not updated since the GPS receiver is positioned in a GPS signal non-receipt area for a long time, the initial positioning time requires a long time when the mobile station comes into a position where the GPS signal can be directly received.

Similarly, in the case where the power of the GPS receiver is on in the GPS signal non-receipt area and the ephemeris is kept old and not updated since the GPS receiver stays in the GPS signal non-receipt area for a long time, etc., the accuracy sometimes deteriorates at the time of the initial positioning.

Regarding this point, for example, Japanese patent application laid-open publication No. 7-280917 (hereinafter, referred to as [document 3]) discloses a technology of re-transmitting a GPS signal to a GPS signal non-receipt area so that the mobile station that moves in the GPS signal non-receipt area can be promptly positioned when the mobile station comes into a position where the GPS signal can be directly received. Additionally, this article discloses another technology of implementing maintenance, inspection, repair, etc. of the GPS receiver even indoors where the GPS signal cannot be received.

Meanwhile, the latest car navigation systems offer an apparatus for continuing the positioning of the own apparatus using a gyrocompass, a direction sensor, a distance sensor, etc. even in the position where such a GPS signal cannot be received.

The positioning method using a GPS receiver is described in detail, for example, in the following document. Jun Tsuchiya and Hiroshi Tsuji: "Foundation of new GPS measurement", Japan Association of Surveyors, Sep. 30, 2002.

In the technology that is disclosed in the document 1, a reception unit for receiving the infrared rays signal including position ID is required so that the hard scale of a mobile station increases. Furthermore, position ID is required to be set up for each position ID oscillator and at the same time, a position coordinate should be stored in advance for each position ID of the mobile station. Since almanac and ephemeris are not updated while a mobile station stays indoors, the initial positioning time is delayed when the mobile station comes outdoors and can directly receive a GPS signal.

According to the above-mentioned technology disclosed in the document 2, it is necessary to store in advance the latitude and longitude data about the position of a transmission apparatus in this apparatus. Additionally, a receiver that can receive both the GPS signal and the latitude and longitude data in the mobile station is required. In the case where a GPS signal is received or the latitude and longitude data is received, the processing becomes complicated by adding a procedure for determining whether the position positioned by the GPS signal or the latitude and longitude data should be used. Furthermore, in the case where the position-positioning is implemented using the GPS signal that is re-transmitted, the GPS signal is not propagated through the original propagation path but through the re-transmission apparatus. Consequently, the accuracies of the positioning results sometimes become low since an error occurs on the attainment time of the GPS signal.

Even in the technology disclosed in either document 1 or 2, the latitude and longitude data that is stored in advance is transmitted to the mobile station in a GPS signal non-receipt area. Therefore, in the case where the GPS signal non-receipt area itself moves, for example, in the case where the GPS signal non-receipt area is an area in a car, a ship, an airplane, etc. and the terminal possessed by a person who is in the car, etc., is a mobile station, this technology cannot be used.

In the technology that is disclosed in the above-mentioned document 3, a mobile station can be promptly positioned when it comes into a position where the GPS signal can be directly received. However, in the case where the position-positioning is implemented using the GPS signal that is re-transmitted, the GPS signal is not propagated through the original propagation path but through the re-transmission apparatus. Consequently, the accuracies of the positioning results become low since an error occurs on the attainment time of the GPS signal.

In an apparatus for continuing a positioning operation for the own position in the GPS signal non-receipt area among the car navigation system, etc. using a gyrocompass, a direction sensor, a distance sensor, etc., the outputs of various kinds of sensors include errors so that the accuracies of the positioning results become low. Especially, in the case where the terminal possessed by a person is a mobile station, the output errors of such various kinds of sensors increase in accordance with the attitude and movement of the person so that the accuracies of the positioning results might further decrease.

SUMMARY OF THE INVENTION

The subject of the present invention is to implement the highly-accurate position-positioning using a GPS positioning apparatus in a GPS signal non-receipt area and also to direct the GPS positioning apparatus to be promptly positioned when this apparatus comes into a position where the GPS signal can be directly received, thereby increasing the positioning accuracy.

A positioning signal transmitting apparatus according to one of the preferred embodiments of the present invention comprises a reception unit for receiving a GPS signal transmitted from a satellite configuring a global positioning system (GPS); a signal generation unit for generating a plurality of positioning signals that are used for the positioning by a positioning apparatus for implementing the positioning based on the GPS signal and that are in a same form as that of the GPS signal; a transmission unit for transmitting the positioning signals; and a transmission control unit for controlling the transmission unit in such a way that this unit assigns a time difference based on the GPS signal received by the reception unit to each of the positioning signals and transmits the assigned positioning signals.

According to this configuration, since the positioning signal that is in the same form as that of a GPS signal is transmitted, the positioning apparatus need not be provided with a means for receiving the information other than a GPS signal so that the position-positioning can be implemented even in a GPS signal non-receipt area by receiving this positioning signal. Furthermore, a time difference based on the GPS signal that is received by the reception unit is assigned to each of the positioning signals to be transmitted. Therefore, the time difference of the transmission timing of positioning signals can be corrected with a high degree of accuracy by receiving the GPS signals from a plurality of satellites by the reception unit. Consequently, the positioning apparatus can implement the highly-accurate positioning based on this corrected positioning signal.

Meanwhile, in a positioning signal transmission apparatus according to the present invention, the signal generation unit can be configured to generate at least three kinds of positioning signals showing that transmission sources are different to each other.

In this way, the position-positioning at least at the two dimensions can be implemented by the positioning apparatus.

Furthermore, in the positioning apparatus according to the present invention, the signal generation unit can be configured to generate a positioning signal based on a navigation message shown in the GPS signal received by the reception unit.

Then, a positioning signal in a same form as that of the GPS signal that is not received by the reception unit can be generated.

Meanwhile, the transmission control unit can be configured to implement a control based on the navigation message shown in the GPS signal.

Thus, a positioning signal in a same form as that of the GPS signal that is not received by the reception unit can be controlled.

Furthermore, in the positioning signal transmission apparatus of the present invention, the signal generation unit can be configured to generate at least three kinds of positioning signals showing that the transmission sources are different to each other by configuring this unit to generate the positioning signal using pseudo random noise codes with different patterns.

Furthermore, in the positioning signal transmission apparatus of the present invention, the transmission unit can be configured to transmit the positioning signal including the navigation message shown in the GPS signal received by the reception unit.

In this way, when the reception unit comes into a position where the GPS signal can be directly received, this unit can be promptly positioned and the positioning accuracy is increased.

Furthermore, in the positioning signal transmission apparatus, the reception unit can be mounted in a position where the GPS signal is preferably received in comparison with the positioning apparatus.

Thus, the accuracy of the positioning apparatus is enhanced by receiving GPS signals from a plurality of satellites.

In the positioning signal transmission apparatus of the present invention, the transmission unit can be configured to direct a transmission direction of the positioning signal to have a directivity.

In this way, the interference of the positioning signals is suppressed in the case where the positioning signal transmission apparatuses are adjacently mounted, thereby decreasing the effect of the positioning signal that is transmitted from the adjacently mounted positioning signal transmission apparatus and is not used for the position-positioning, on the position-positioning performed at the positioning apparatus.

Furthermore, in the positioning signal transmission apparatus of the present invention, the signal generation unit can be configured to generate the positioning signal in a same form as that of the GPS signal transmitted by the satellite that is present in the sky when the positioning signal is generated, which is shown in the navigation message in the GPS signal received by the reception unit.

In this way, the positioning apparatus for implementing the search of a signal based on the navigation message can easily acquire the positioning signal transmitted from the positioning signal transmission apparatus.

Furthermore, in the positioning signal transmission apparatus of the present invention, the transmission control unit can be configured to implement the control so as to assign to each positioning signal a time difference according to a propagation time of the GPS signal from the satellite to the reception unit, thereby transmitting the assigned positioning signal.

Regarding the propagation time, the calculation accuracy can be enhanced by receiving GPS signals from a plurality of satellites so that the accuracy of the position-positioning by the positioning apparatus based on a positioning signal is also enhanced by implementing the above-mentioned operations.

At this time, the transmission control unit can be configured to calculate a propagation time of the GPS signal based on a position of the satellite shown in both a navigation message of the GPS signal and a position of the reception unit positioned based on the GPS signal.

In this way, positioning signals generated for the satellites of transmission sources of the GPS signals that are not fully received by the reception unit can be controlled.

At this time, the transmission control unit can be configured to calculate a propagation time of the GPS signal based on an altitude difference between a position of the reception unit and that of a positioning apparatus for receiving a positioning signal transmitted by the transmission unit.

In the case where the height of a mounting position of the reception unit and that of the positioning apparatus are too high to be ignored, the accuracy of the position-positioning performed by the positioning apparatus based on positioning signals can be enhanced.

Furthermore, in the positioning signal transmission apparatus, a detection unit for detecting the approach of a mobile station into a predetermined area is further provided and the transmission control unit can be configured to control the transmission unit in such a way that this unit transmits the positioning signal according to a detection of the approach.

According to this configuration, the electric power of the positioning signal transmission apparatus can be decreased and at the same time, in the case where the position signal transmission apparatuses are adjacently mounted, the interference between positioning signals can be prevented.

Furthermore, the positioning signal transmission apparatus is configured in such a way that the reception unit and the transmission unit are separately mounted and the transmission of a signal from the reception unit to the transmission unit is implemented through a signal cable.

In this way, it becomes easy to mount the reception unit in, for example, a position where the GPS signal preferably comes, separately from the transmission unit.

In the positioning signal transmission apparatus of the present invention, the reception unit and the transmission unit are separately mounted and the transmission of a signal from the reception unit to the transmission unit is implemented through a radio transmission path.

In this way, it becomes easy to mount the reception unit in, for example, a position where the GPS signal preferably comes, separately from the transmission unit.

Meanwhile, in the positioning signal transmission apparatus of the present invention, the signal transmission unit can be configured to generate the positioning signal in a same form as that of a GPS signal transmitted by the satellite that is present in the sky at a time of generating the positioning signal, which is shown in the navigation message but that cannot be used for the positioning in a position of the reception unit when generating the positioning signal.

Thus, it becomes possible to direct the positioning apparatus that receives the positioning signal to recognize that the positioning signal being received is not from the satellite but from the positioning signal transmission apparatus.

The positioning signal transmission apparatus of the present invention can be configured in such a way that the transmission unit includes a transmission antenna for transmitting the positioning signal, the reception unit includes a reception antenna for receiving the GPS signal, the transmission antenna and the reception antenna are separately mounted and the transmission control unit implements a control based on a difference between a position of the transmission antenna and that of the reception antenna.

In this way, the deterioration of an accuracy of the position-positioning by the positioning apparatus in which the transmission antenna and the reception antenna are separately mounted can be suppressed.

According to the method of transmitting a positioning signal of another preferred embodiment of the present invention comprises steps of generating a plurality of positioning signals that are used for a positioning operation by a positioning apparatus for implementing a positioning operation based on a GPS signal transmitted from a satellite configuring a global positioning system (GPS) and that are in a same form as a form of the GPS signal and assigning a time difference based on the received GPS signal to each positioning signal, thereby transmitting the assigned positioning signals.

By the above-mentioned method, the operation identical to that of the above-mentioned positioning signal transmission apparatus of the present invention can be also obtained.

A positioning apparatus of another preferred embodiment of the present invention is used in a positioning system including a positioning apparatus for implementing the positioning based on a GPS signal transmitted from the satellite configuring a global positioning system (GPS) and a positioning signal transmission apparatus for transmitting a positioning signal that is used for the positioning by the positioning apparatus and that is in a same form as that of the GPS signal. The positioning signal transmission apparatus comprises a reception unit for receiving the GPS signal; a signal generation unit for generating a plurality of positioning signals; a transmission unit for transmitting the generated positioning signal by the signal generation unit; a transmission control unit for controlling the transmission unit in such a way that this unit assigns a time difference based on a GPS signal received by the reception unit to each positioning signal and transmits the assigned positioning signal. The transmission unit transmits the positioning signal including a navigation message shown in the GPS signal received by the reception unit. The positioning apparatus comprises a signal reception unit for receiving a signal used for the positioning; a determination unit for determining, based on the navigation message included in the signal, whether or not a signal received by the signal reception unit is transmitted by the positioning signal transmission apparatus; and a notification unit for notifying the determination results.

By the above-mentioned positioning apparatus, the operation of the positioning apparatus of the present invention can be obtained. Furthermore, it can be recognized whether or not the positioning signal being received is from a satellite or the positioning signal transmission apparatus, thereby notifying the recognition results to a user of the positioning apparatus.

In the positioning apparatus of the present invention, the signal generation unit can be configured to generate the positioning signal in a same form as that of a signal transmitted by the satellite that is not present in the sky, which is shown in the navigation message. The determination unit can be also configured to determine that the positioning signal is transmitted by the positioning signal transmission apparatus in the case where the signal reception unit receives the positioning signal in a same form as that of a signal transmitted by the satellite that is not present in the sky, which is shown in the navigation message.

In this way, it can be determined by the determination unit based on the navigation message whether or not the signal received using the signal reception unit is transmitted by the positioning signal transmission apparatus.

Consequently, the present invention can realize the precise position-positioning using a GPS positioning apparatus in a GPS signal non-receipt area.

BRIEF DESCRIPTION OF THE DRAWINGS

The present invention will be more apparent from the following detailed description when the accompanying drawings are referenced to.

FIG. 5 shows acquisition timing of the pseudo random noise codes that are obtained from the GPS signals of respective satellites, which are received by a positioning signal transmission apparatus in the case of FIG. 4;

FIG. 8 shows the configuration example of the positioning apparatus;

DESCRIPTION OF THE PREFERRED EMBODIMENTS

The following is the explanation of the preferred embodiments of the present invention in reference to the drawings.

Figure 1:
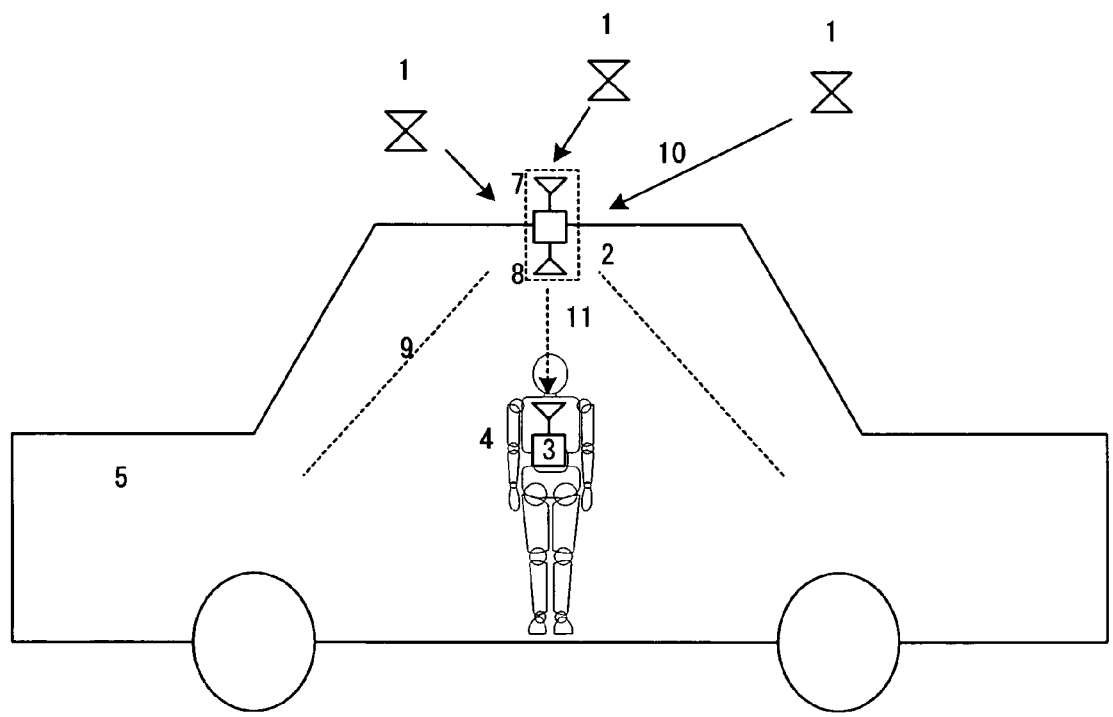
FIG. 1 shows the first mounting example of a positioning signal transmission apparatus for implementing the present invention.

FIG. 1 shows the first mounting example of a positioning signal transmission apparatus for implementing the present invention and especially it shows an example of mounting a positioning signal transmission apparatus 2 in a vehicle 5.

In FIG. 1, a mobile station provided with a positioning apparatus 3 that can implement the positioning on the basis of a GPS signal is a person 4. The positioning apparatus 3 is attached to the person 4 or the person 4 carries the positioning apparatus 3.

A reception antenna 7 of the positioning signal transmission apparatus 2 is mounted outside etc. a vehicle 5 where a radio wave (that is, a GPS signal 10) from a satellite 1 configuring GPS comes more preferably than at the present position of the positioning apparatus 3, which is apparent.

A transmission antenna 8 is mounted for enabling a positioning signal 11 that is the output of the positioning signal transmission apparatus 2 to reach to the positioning apparatus 3 in the vehicle 5. In the present embodiment, the transmission apparatus 2 outputs at least three kinds of the positioning signals 11 so that at least three transmission antennas 8 are mounted. Furthermore, the positioning result of the positioning apparatus 3 shows the position of the reception antenna 7. Therefore, an antenna that has the directivity, for example, an array antenna, etc. is used as the transmission antenna 8 so that an attainment range 9 of the positioning signal 11 is restricted as occasion demands.

The positioning signal transmission apparatus 2 receives the GPS signal 10 from the satellite 1 and positions its own position. Then, the apparatus generates at least three pseudo random noise codes based on this positioned position and the navigation message that is shown in the received GPS signal 10 and assigns a time difference to each pseudo random noise code by delaying the code, thereby transmitting these codes as the positioning signals 11 from the transmission antenna 8. Furthermore, the form (carrier wave frequency, radio wave form, modulation method, information storage form, etc.) of the positioning signal 11 is the same as that of the GPS signal 10. That is, the form of the positioning signal 11 is such that the positioning apparatus 3 that receives the positioning signal 11 can easily implement the position-positioning based on the positioning signal 11.

The time difference that is assigned to the positioning signal 11 at this time is controlled in such a way that the positioned position becomes the same as that of the positioning signal transmission apparatus 2 in the case where the positioning apparatus 3 for receiving the positioning signal 11 implements the position-positioning. According to this control, the positioned position of the positioning apparatus 3 is the same as that of the positioning signal transmission apparatus 2 as long as the positioning apparatus 3 receives the positioning signal 11. Accordingly, the positioning apparatus 3 can continue the positioning without directly receiving the GPS signal 10.

Furthermore, the navigation message that is shown in the received GPS signal 10 is included in the positioning signal 11 in accordance with the signal form of the GPS signal 10. In this way, the positioning apparatus 3 can sequentially update the navigation message without directly receiving the GPS signal 10 since it receives the positioning signal 11. Consequently, the apparatus 3 can be promptly conditioned when it comes out of the vehicle 5 where the GPS signal 10 can be directly received.

Figure 2:
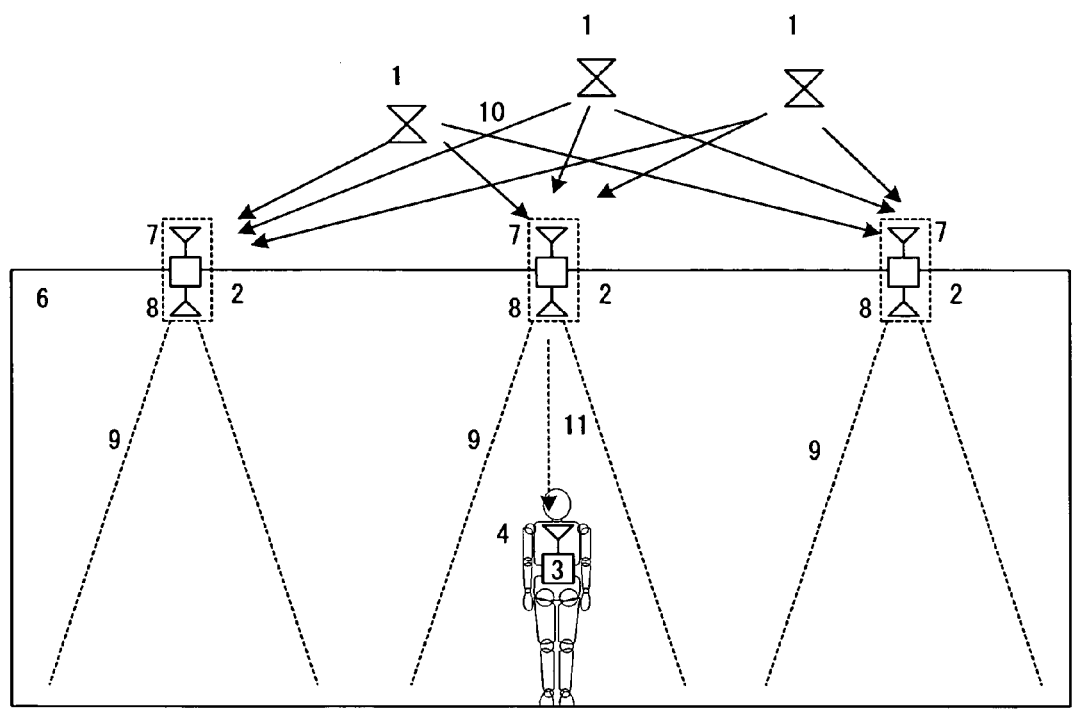
FIG. 2 shows the second mounting example of a positioning signal transmission apparatus for implementing the present invention.

The following is the explanation of FIG. 2. FIG. 2 shows the second mounting example of the positioning signal transmission apparatus for realizing the present invention and especially shows an example of mounting the positioning signal transmission apparatus 2 on a building 6 that is built on the ground.

In FIG. 2, a mobile station provided with the positioning apparatus 3 for implementing the positioning on the basis of the GPS signal is the person 4. The positioning apparatus 3 is attached to the person 4 or the person 4 carries the positioning apparatus 3.

The reception antenna 7 of the positioning signal transmission apparatus 2 is mounted on the roof, etc. outside the building 6 where a radio wave (that is, the GPS signal 10) from the satellite 1 configuring GPS comes more preferably than in the present position of the positioning apparatus 3, which is apparent.

The transmission antenna 8 is mounted for enabling the positioning signal 11 that is the output of the positioning signal transmission apparatus 2 to reach to the positioning apparatus 3 inside the building 6. In the present preferred embodiment, the positioning signal transmission apparatus 2 outputs at least three kinds of the positioning signals 11 so that at least three transmission antennas 8 are mounted for each positioning signal transmission apparatus 2. The positioning result of the positioning apparatus 3 shows the position of the reception antenna 7 so that an antenna having the directivity, for example, an array antenna, etc. is used as the transmission antenna 8. As occasion demands, the attainment range 9 of the positioning signal 11 is restricted.

In FIG. 2, three positioning signal transmission apparatuses 2 are mounted on the building 6 but the number of these apparatuses mounted on the building 6 can be changed according to the accuracy that is required for the positioning in the building 6 using the positioning apparatus 3 or the width of the building 6.

Furthermore, in the case where a plurality of the positioning signal transmission apparatuses 2 is mounted on the building 6, the attainment range 9 of the positioning signal 11 is narrowly restricted by sharpening the directivity of the transmission antenna 8 of the positioning signal transmission apparatus 2. Accordingly, the influence (interference etc. of the positioning signal 11) of adjacently mounted positioning signal transmission apparatus 2 on the positioning of the positioning apparatus 3 can be prevented. Here, if the number of the positioning signal transmission apparatuses 2 mounted on the building 6 increases and the attainment range 9 for each positioning signal transmission apparatus 2 is narrowed, the relative position relation between the positioning apparatus 3 for implementing the positioning based on the positioning signal 11 and the signal transmission apparatus 2 for outputting the positioning signal 11 become closer by the narrowed amount. Consequently, the accuracy of the positioning using the positioning apparatus 3 improves.

Furthermore, also in the mounting example shown in FIG. 2 like that shown in FIG. 1, the navigation message that is shown in the received GPS signal 10 is included in the positioning signal 11 in accordance with the signal form of the GPS signal 10. In this way, the positioning apparatus 3 can sequentially update the navigation message without directly receiving the GPS signal 10 since it receives the positioning signal 11. Consequently, the apparatus 3 can be promptly conditioned when it comes out of the building 6 where the GPS signal 10 can be directly received.

Figure 3:
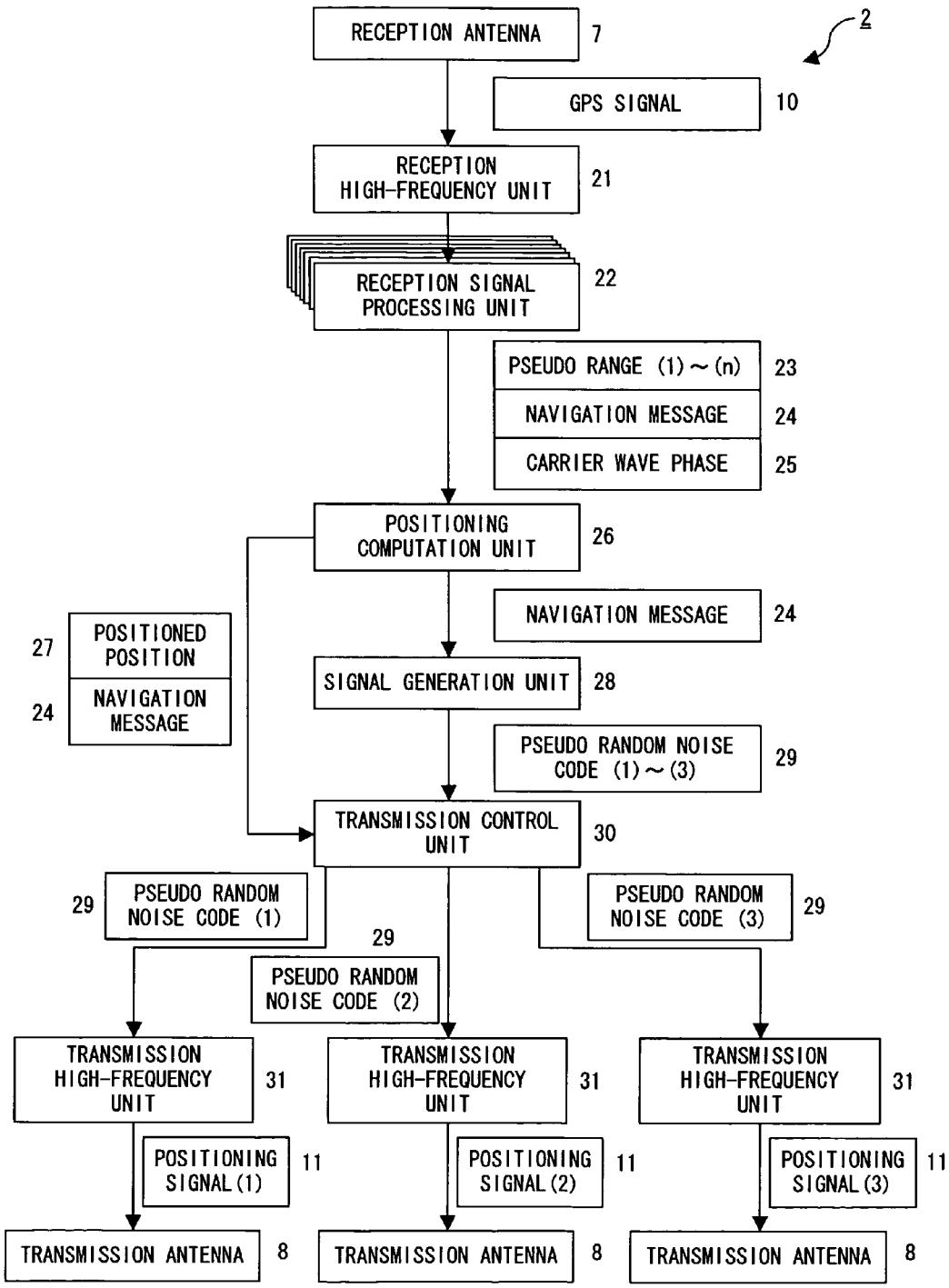
FIG. 3 is a block diagram showing the configuration of the positioning signal transmission apparatus for implementing the present invention.

The following is the explanation of FIG. 3. FIG. 3 is a block diagram showing the configuration of the positioning signal transmission apparatus 2 for realizing the present invention. In FIG. 3, the reception antenna 7, a reception high-frequency unit 21, a reception signal processing unit 22 and a positioning computation unit 26 function in the same way as those of the units mounted on the well-known GPS receiver.

The reception antenna 7 receives a radio wave from the satellite 1 configuring GPS, that is, the GPS signal 10. The reception antenna 7 is mounted in the position where the radio wave from the satellite 1 comes preferably. For example, the reception antenna 7 is mounted sufficiently far from the transmission antenna 8. Otherwise, an electromagnetic wave shield should be mounted between the reception antenna 7 and the transmission antenna 8 or the like to prevent the reception antenna 7 from receiving the positioning signal 11 that is transmitted from the transmission antenna 8.

The reception high-frequency unit 21 amplifies the GPS signal 10 that is received by the reception antenna 7 up to a predetermined signal level and at the same time it analogue-digital converts the amplified signal.

The reception signal processing unit 22 calculates a pseudo range 23 from each satellite 1 on the basis of the GPS signal 10 that is converted into digital data and at the same time it takes out a navigation message 24 from the GPS signal 10 to be supplied to the positioning computation unit 26. Furthermore, in order to offer the high positioning accuracy, it is possible to obtain a carrier wave phase 25 and supply the obtained phase to the positioning computation unit 26.

The following is the explanation of the pseudo range 23. The pseudo range 23 is a pseudo range between the satellite 1 and the positioning signal transmission apparatus 2 (reception antenna 7) and this range can be calculated by an equation such as (pseudo propagation delay time)×(light velocity). Here, this pseudo propagation delay time includes a difference between the time indicated by a clock possessed by the satellite 1 and the time indicted by a clock possessed by the signal processing unit 22. Accordingly, the pseudo range 23 is an algebraic sum of the real distance from the satellite 1 to the positioning signal transmission apparatus 2 and the distance error based on the clock error.

In the case of the two-dimensional positioning for positioning only a position on the surface of earth without positioning a position in a height direction, the real distance is obtained from a total of three unknowns of this clock error and two-dimensional coordinate so that at least three pseudo ranges 23 from satellites 1 are required.

Thus, at least three pseudo rages are required in the case of two-dimensional positioning and accordingly at least three reception signal processing units 22 are also required. Furthermore, in a usual GPS receiver, eight or eighteen reception signal processing units 22 are sometimes mounted by reason of enabling the three-dimensional positioning for positioning the position in a height direction, by reason of enhancing the positioning accuracy by obtaining the unknowns using a least-square method on the basis of the pseudo ranges 23 from many satellites 1, or the like.

The positioning computation unit 26 calculates a positioned position 27 etc. of the positioning signal transmission apparatus 2 (reception antenna 7) on the basis of at least three pseudo ranges 23, the navigation message 24 and the carrier wave phase 25 that are supplied from the reception signal processing unit 22. Then, the unit 26 supplies the calculated positioned position 27 etc. to a transmission control unit 30 and at the same time it supplies the navigation message 24 to a signal generation unit 28 and the transmission control unit 30.

The signal generation unit 28 selects the satellite 1 that exists in the sky at that point in reference to the navigation message 24 and generates the pseudo random noise code 29 (C/A cord: Clear and Acquisition Code or Coarse and Access Code) regarding the selected satellite 1, thereby transmitting the generated code to the transmission control unit 30. In order to enable the two-dimensional positioning using the positioning apparatus 3, the signal generation unit 28 selects at least three satellites that exist in the sky at that point and generates the pseudo random noise code 29 for each of the selected satellites 1. Consequently, at least three kinds of pseudo random noise codes 29 are generated.

The pseudo random noise code 29 is a cord that is individually assigned to each of the satellites 1 configuring GPS and this code is used for the GPS receiver to specify from which satellite the received signal is transmitted. Namely, the signal generation unit 28 generates the pseudo random noise code 29 that is the same as the code of the GPS signal 10 transmitted from the satellite 1.

The transmission control unit 30 calculates the distance to each satellite 1 that is selected by the signal generation unit 28 according to the positioned position 27 and the orbit information about the satellite that is shown in the navigation message 24. Furthermore, the unit 30 calculates a time (propagation time) required when a radio wave propagates each calculated distance. Then, the unit calculates the difference among the calculated propagation times with regard to the respective satellites 1 and assigns the propagation time differences to the codes by individually delaying the respective pseudo random noise codes 29, thereby supplying the assigned codes to a transmission high-frequency unit 31. In order to delay the pseudo random noise code 29, the generated pseudo random noise code 29 is stored once in a semiconductor memory and the generated pseudo random noise code 29 is read out from the memory at a timing based on the above-mentioned time difference.

Furthermore, the signal generation unit 30 includes the navigation message 24 that is obtained from the satellite 1 in the pseudo random noise code 29 that is generated to belong to the satellite 1. Then, the thus-processed pseudo random noise code 29 is supplied to the transmission control unit 30. As a method of including the navigation message 24 in the pseudo random noise code 29, a method that is publicly-known in the field of the GPS can be used as it is.

The transmission high-frequency unit 31 PSK-modulates (Phase Shift Keying) using the pseudo random noise code 29 the carrier wave having a frequency same as that used in a GPS satellite in accordance with the publicly-known diffuse spectrum communication system that is used in a GPS satellite. Then, the unit 31 amplifies the obtained modulation signal up to a specified signal level so as to obtain the positioning signal 11. Then, the obtained positioning signal 11 is supplied to the transmission antenna 8 to be transmitted. In this way, the positioning signal 11 is identical to the GPS signal 10 in the form of a signal such as a carrier wave frequency, a radio wave form, a modulation form, an information storage form, etc. Therefore, if the positioning apparatus 3 can implement the positioning on the basis of the GPS signal 10, this apparatus can also implement the positioning based on the positioning signal 11.

Furthermore, at least three kinds of the pseudo random noise codes 29 are generated as mentioned above. Therefore, at least three transmission high-frequency units 31 are mounted to correspond one-to-one with the codes. Then, the generated three kinds of pseudo random noise codes 29 are supplied to the respective transmission high-frequency units 31 for each kind and the positioning signal 11 is transmitted in accordance with the time difference that is assigned to the pseudo random noise code 29 using the transmission control unit 30.

Furthermore, it is assumed in FIG. 3 that the signal generation unit 28 generates three kinds of the pseudo random noise codes 29 and consequently three kinds of the transmission high-frequency units 31 are also mounted. Here, in the case where the three-dimensional positioning is implemented by the positioning apparatus 3, the signal generation unit 28 generates four kinds of the pseudo random noise codes 29 and four kinds of the transmission high-frequency units 31 are also mounted.

For the transmission antenna 8, an antenna that has the directivity, for example, an array antenna, etc. is used and the attainment range 9 of the positioning signal 11 is restricted as occasion demands. Furthermore, the above-mentioned action is taken to prevent the positioning signal 11 that is transmitted from the transmission antenna 8 from being received by the reception antenna 7.

The following is further explanation of a delay processing of the pseudo random noise code 29 by the signal generation unit 30.

Figure 4:
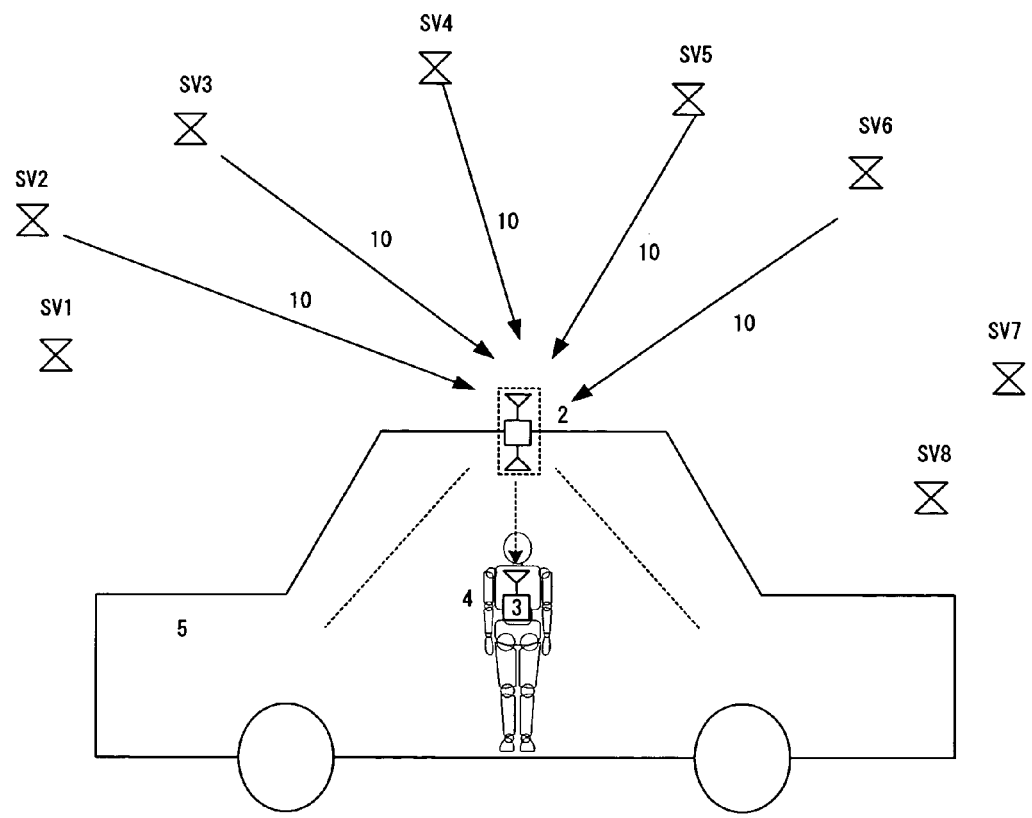
FIG. 4 shows one example of the relation between the arrangement of satellites in the sky and the reception situation of GPS signals.

FIG. 4 shows one example of the relation between the arrangement of satellites in the sky and the reception situation of GPS signals.

In the example of FIG. 4, it is assumed that the positioning signal transmission apparatus 2 mounted outside the vehicle 5 recognizes that eight satellites from SV1 to SV8 exist in the sky at present based on the contents of the navigation message included in the previously-received GPS signal 10. It is further assumed that the GPS signals 10 from the respective satellites from SV2 to SV6 each having the comparatively high angle of elevation among the satellites can be actually received at a sufficient signal level. On the other hand, the respective signal levels regarding the GPS signals 10 from the respective satellites such as SV1, SV7 and SV8 each having the comparatively low angle of elevation are not sufficient so that these signals cannot be used for the position-positioning. Furthermore, it is assumed that the positioning signal transmission apparatus 2 has at least five reception signal processing units 22.

Here, FIG. 5 is explained. FIG. 5 shows the acquisition timings of the pseudo random noise codes that are obtained from the GPS signals 10 of the respective satellites, which are received using the positioning signal transmission apparatus 2 in FIG. 4.

In the following explanation, for the simplification of the explanation, it is assumed that the correction rate of a clock possessed by each satellite included in a navigation message is already reflected and the times of clocks of the respective satellites are in synchronization with a standard time. In addition, the pseudo random noise codes are repeatedly received in cycles of 1 ms but here FIG. 5 shows the reception timings of the pseudo random noise code that assigns the realistic positioning solution in the neighborhood of the surface of earth.

In FIG. 4, it is assumed that the time of the clock possessed by the positioning signal transmission apparatus 2 is delayed by only Te regarding the standard time of a satellite. Accordingly, the propagation delay time of the pseudo random noise code transmitted from, for example, the satellite SV2 is observed by the positioning signal transmission apparatus 2 as the total time (Te+T2) that is obtained by adding a delay time Te from the standard time and a real propagation delay time T2 of the GPS signal from the satellite SV2. This total time becomes the above-mentioned pseudo delay time regarding the satellite SV2. Same applies to the propagation delay time of the GPS signal with regard to each of other satellite SV3 to SV6.

As mentioned before, in the case of the two-dimensional positioning of only a position on the surface of earth, a total of three unknowns such as an error Te and a two-dimensional coordinate of this clock (for example, the coordinate (X, Y)) should be obtained. In order to obtain the unknowns, the simultaneous equation including three equations using the coordinate of at least three satellites and the attainment time of the GPS signals 10 from these satellites should be solved. Here, the positioning computation unit 26 calculates the pseudo range 23 of each of a total of five satellites from SV2 to SV6 that receive GPS signals at the reception signal level greater than the standard value. Then, the unit solves five equations obtained using the thus-obtained pseudo ranges 23 and the coordinate value that shows the position of each satellite and is obtained from the navigation message, according to a least-square method. Consequently, the unit 26 enhances the accuracy of the calculation results of the unknowns.

Figure 6:
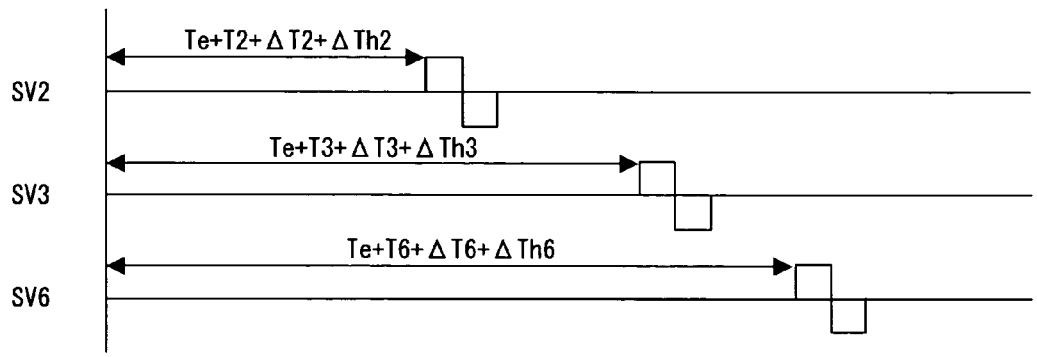
FIG. 6 shows transmission timing of the pseudo random noise codes that are transmitted by the positioning signal transmission apparatus in the case of FIG. 4 (No.1)

Then, FIG. 6 is explained. FIG. 6 shows the transmission timings of the pseudo random noise codes transmitted by the positioning signal transmission apparatus 2 in FIG. 4.

First of all, from among the satellites that transmit the received GPS signals 10, the signal generation unit 28 selects three satellites each having a preferable geometrical arrangement relation between the unit and the positioning signal transmission apparatus 2, for example, satellites having significantly different directions from the positioning signal transmission apparatus 2 on the basis of the navigation message 24. Then, the unit 28 generates the pseudo random noise codes 29 with regard to the selected satellites and supplies the generated codes to the transmission control unit 30.

The transmission control unit 30 calculates the distance to each satellite that is selected using the signal generation unit 28 according to the positioned position 27 and the orbit information about the satellite that is shown in the navigation message 24. Furthermore, the unit calculates a time (propagation time) required when a radio wave propagates each calculated distance. Then, the unit 30 calculates a difference among the calculated propagation times with regard to the respective satellites and assigns the time difference to each of the codes by delaying the respective pseudo random noise codes 29 that are supplied from the signal generation unit 28. Then, the unit 30 supplies the assigned code to the transmission high-frequency unit 31. Lastly, the unit 31 transmits the code as the positioning signal 11.

In FIG. 4, it is assumed that the signal generation unit 28 selects the satellites SV2, SV3 and SV6 at this time. The transmission timing (supply timing from the signal generation unit 28 to the transmission high-frequency unit 31) of the pseudo random noise code 29 with regard to the satellite SV2 in this case is explained in reference to FIG. 6.

The transmission timing of the pseudo random noise code 29 with regard to the satellite SV2 in this case is the algebraic sum of the above-mentioned propagation delay time Te+T2 with regard to the satellite SV2 that is observed by the positioning signal transmission apparatus 2, a correction value ΔT2 for improving the accuracy of T2 that is obtained by the calculation by the positioning computation unit 26 using a least-square method and a correction value ΔTh2 reflecting the difference between the positioning signal transmission apparatus 2 and the positioning apparatus 3 regarding the position in a height direction. Here, ΔTh2 is set according to the altitude difference between the altitude of a place where the reception antenna 7 of the positioning position transmission apparatus 2 is mounted and that of the positioning apparatus 3. In the case where this difference is small enough to be ignored, this correction value need not be set.

The time difference assigned to the pseudo random noise code 29 that is generated by the signal generation unit 28 is corrected using the correction value such as ΔT2 or ΔTh2. Therefore, the position-positioning with a high accuracy becomes possible using the positioning apparatus 3 in comparison with a relay apparatus (for example, the apparatus that is disclosed in the above-mentioned document 3) for simply re-transmitting the received GPS signal 10 to a GPS signal non-receipt area.

The transmission timing of the pseudo random noise codes 29 of other satellites SV3 and SV6 are set like the timing of the satellite SV2. Then, the transmission control unit 30 assigns the time differences to the codes by delaying the respective pseudo random noise codes 29 so as to reflect these transmission timing. Then, the unit 30 supplies the assigned codes to the high-frequency unit 31. Consequently, the unit 30 directs the unit 31 to transmit the assigned codes as the positioning signals 11.

In this way, the positioning apparatus 3 can implement the position-positioning with high accuracy even if it is located in the vehicle 5 that is the non-receipt area of the GPS signal 10 in FIG. 4.

The following is the variant example of the present invention.

Figure 7:
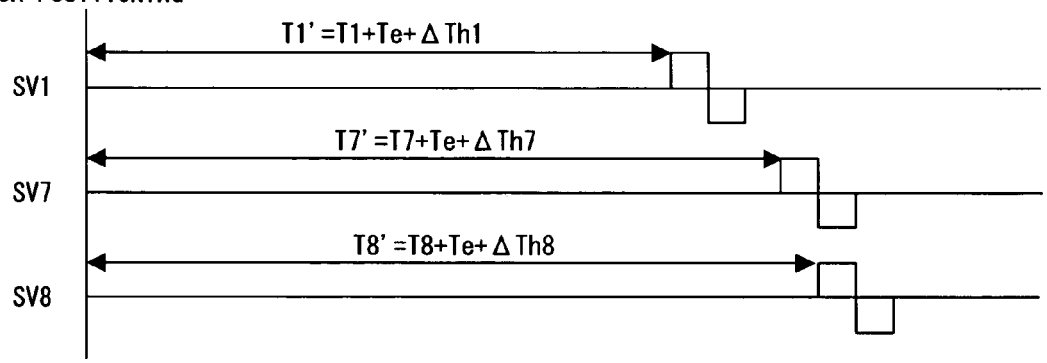
FIG. 7 shows transmission timing of the pseudo random noise codes that are transmitted by the positioning signal transmission apparatus in the case of FIG. 4 (No.2)

First of all, FIG. 7 is explained. FIG. 7 shows the transmission timings of the pseudo random noise code that is transmitted by the positioning signal transmission apparatus 2 in the case of FIG. 4 like FIG. 6.

In this variant example, the signal generation unit 28 further selects a satellite from which the GPS signal 10 is not actually received although the navigation message 24 shows a fact such that the satellite exists in the sky at that point, and the unit 28 further generates the pseudo random noise code 29 with regard to the selected satellite.

The ones matching with the above-mentioned condition in the case of FIG. 4 are satellites SV1, SV7 and SV8 each having the low angle of elevation which is seen from the positioning signal transmission apparatus 2. The signal generation unit 28 further selects these satellites and generates the pseudo random noise codes 29 that are the same as those used by the selected satellites.

The transmission control unit 30 calculates the distance to the positioning signal transmission apparatus 2 from each of the satellites SV1, SV7 and SV8 based on the positioned position 27 and the present position of each of the satellites SV1, SV7 and SV8, which is obtained from the navigation message 24. Then, the unit 30 divides the calculated distance by the velocity of light, thereby calculating the propagation time required in the case where the GPS signal 10 propagates the distance from each of the satellites SV1, SV7 and SV8 to the positioning signal transmission apparatus 2. After this, the unit 30 sets the transmission timing (supply timing from the signal generation unit 28 to the transmission high-frequency unit 31) of the pseudo random noise code 29 of each of the satellites SV1, SV7 and SV8 on the basis of this calculation result.

For example, in FIG. 7, the transmission timing T1' of the pseudo random noise code 29 with regard to the satellite SV1 is the algebraic sum of a propagation time T1 required in the case where the GPS signal 10 propagates the distance from the satellite SV1 to the positioning signal transmission apparatus 2, the above-mentioned difference Te from the standard time calculated using the positioning computation unit 26 and the correction value ΔTh1 reflecting the position difference in height between the positioning signal transmission apparatus 2 and the positioning apparatus 3. Here, ΔTh1 need not be set in the case where the altitude difference between the place of mounting the reception antenna 7 of the positioning signal transmission apparatus 2 and that of the positioning apparatus 3 is small enough to be ignored.

Furthermore, the transmission timing T7' and T8' of the respective pseudo random noise codes 29 of other satellites SV7 and SV8 are also set in the same way as in the satellite SV1. Then, the transmission control unit 30 assigns the timing difference to the code in such a way that a difference time between the transmission timing can be reflected by individually delaying each pseudo random noise code 29.

Then, the unit 30 supplies this assigned code to the transmission high-frequency unit 31 to be transmitted as the positioning signal 11.

In this way, the positioning signal transmission apparatus 2 also transmits the pseudo random noise code 29 with regard to the satellite that cannot receive the GPS signal 10. Meanwhile, by being configured as shown in FIG. 8, the positioning apparatus 3 can specify whether a signal that is the foundation of the position-positioning is received directly from a satellite or received from the positioning signal transmission apparatus 2.

In the configuration example of the positioning apparatus 3 shown in FIG. 8, the reception antenna 7, the reception high-frequency unit 21, the reception signal processing unit 22 and the positioning computation unit 26 function in the same way as those provided in the positioning signal transmission apparatus 2, that is, those provided in the publicly-known GPS receiver. The reception signal processing unit 22 supplies the information (reception satellite information 41) that shows to which satellite the pseudo range 23 supplied to the positioning computation unit 26 belong, is supplied to a determination processing unit 42.

The positioning apparatus 3 searches for the signal that can be received on the basis of the navigation message 24 so that the apparatus can easily acquire the positioning signal 11 with regard to the satellite that exists in the sky at the point, which is shown in the navigation message 24.

When the determination processing unit 42 receives the positioned position 27 and the navigation message 24 that are supplied from the positioning computation unit 26, the unit 42 determines whether or not there is a satellite that calculates the pseudo range 23 and obtains the reception level greater than a predetermined level although it is shown in the navigation message 24 that the satellite originally exists in the present position of the positioning apparatus 3 where the signal level becomes low, from among satellites shown in reception satellite information 41 that is supplied from the reception high-frequency unit 21 and include both the number of the satellite that receives signals and the levels of the signals. Here, if such a satellite exists, it is assumed that the positioning apparatus 3 receives the signal set as the foundation of the position-positioning not from the satellite but from the positioning signal transmission apparatus 2 (in other words, the position-positioning is implemented on the basis of the positioning signal 11). On the other hand, in the case where such a satellite does not exist, the positioning apparatus 3 receives the signal set as the foundation of the position-positioning directly from the satellite (in other words, the position-positioning is implemented on the basis of GPS signal 10).

A determination report unit 43 receives the determination result using a determination processing unit 42 and outputs this result in a form of character display and diagram display, by sound, etc., thereby notifying this report to the person 4 that carries the positioning apparatus 3. Furthermore, this unit notifies the result as data to another apparatus. In a center notified a fact by radio transmission, for example, a fact that the data include the positioning result from the positioning apparatus 3 and the signal received from the positioning signal transmission apparatus 2, it is understood that the positioning result measured by the positioning apparatus 3 is positioned using the positioning signal transmitted by the positioning signal transmission apparatus 2 using the positioning signal transmitted when displaying the position of the positioning apparatus 3 on the map of a screen used by an operator of the center.

As mentioned above, the positioning signal transmission apparatus 2 is configured to transmit the pseudo random noise code 29 with regard to the satellite that cannot receive the GPS signal 10 and the positioning apparatus 3 is configured like the one shown in FIG. 8. Consequently, the person 4 can recognize whether the signal set as the foundation of the position-positioning is received directly from a satellite or from the positioning signal transmission apparatus 2.

The following is the explanation of another variant example of the poisoning signal transmission apparatus 2 shown in FIG. 3.

Figure 9:
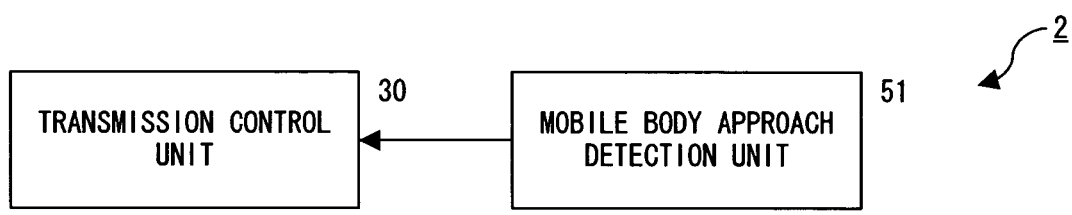
FIG. 9 is the block diagram showing the substantial part of the transformation example of a configuration of the positioning signal transmission apparatus shown in FIG. 3.
Figure 10:
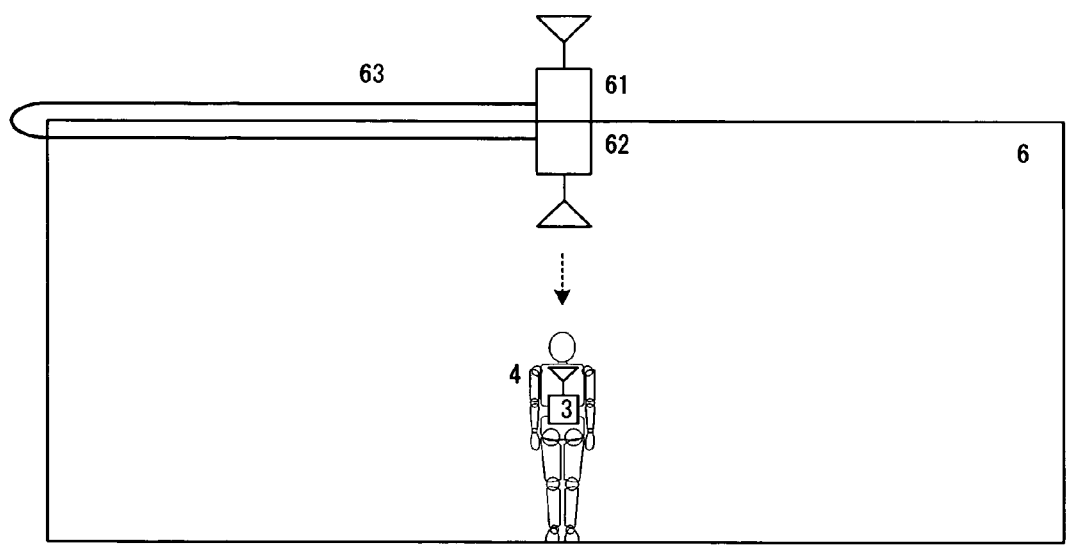
FIG. 10 shows the first mounting example such that components of the positioning signal transmission apparatus shown in FIG. 3 are separated to be mounted.

As shown in FIG. 9, a mobile body approach detection unit 51 is added to the positioning signal transmission apparatus 2 and the detection output is supplied to the transmission control unit 30.

The mobile body approach detection unit 51 is configured using a sensor, for example, an infrared rays sensor, a photoelectric sensor, etc. This unit 51 detects a fact that a mobile body moves in the attainment range 9 of the positioning signal 11 that is transmitted from the transmission antenna 8 and then it supplies the detection result to the transmission control unit 30. The transmission control unit 30 controls the transmission high-frequency unit 31 based on this detection result in such a way that the unit 31 transmits the positioning signal 11 from the transmission antenna 8 only while the mobile body is moving in the attainment range 9 of the positioning signal 11 or only in a predetermined time period since the approach of the mobile body in the attainment range 9 is detected.

In this way, by providing the mobile body approach detection unit 51 with the positioning signal transmission apparatus 2, the transmission of the positioning signal 11 does not constantly continue so that the low consumption electric power of the positioning signal transmission apparatus 2 can be realized. At the same time, the interference among the positioning signals 11 can be prevented in the case where a plurality of positioning signal transmission apparatuses 2 are adjacently mounted in the building 6 as shown in FIG. 2.

The following is the explanation of a mounting example of separately mounting the constituent elements of the positioning signal transmission apparatus 2 shown in FIG. 3.

In the mounting example shown in 10, among the constituent elements of the positioning signal transmission apparatus 2 shown in FIG. 3, the reception antenna 7, the reception high-frequency unit 21, the reception signal processing unit 22 and the positioning computation unit 26 are set as a reception positioning block 61 to be packed in one case and then this case is mounted on the roof of the building 6 or the like. On the other hand, the signal generation unit 28, the transmission control unit 30, the transmission high-frequency unit 31 and the transmission antenna 8 are set as a transmission block 62 to be packed in one case. This case is separately mounted on the ceiling, etc. inside the building 6 that is far from the reception positioning block 61. Then, the reception positioning block 61 and the transmission block 62 are connected via a signal cable 63 and a signal that shows the positioned position 27 and the navigation message 24 is supplied from the reception positioning block 61 to the transmission block 62. Here, since the position of the reception antenna 7 becomes identical to the positioned position of the positioning apparatus 3 at the two-dimensional positioning, the transmission block 62 is mounted directly below the reception positioning block 61 by elongating the signal cable 63 and then the directivity of the transmission antenna 8 is turned in the direction right under the transmission block 62. According to this configuration, an opening for penetrating the positioning signal transmission apparatus 2 need not be made in the ceiling of the building 6.

Instead of using the signal cable 63 for supplying a signal that shows the positioned position 27 and the navigation message 24, from the reception positioning block 61 to the transmission block 62 that are separately mounted, a radio transmission path can be used.

Figure 11:
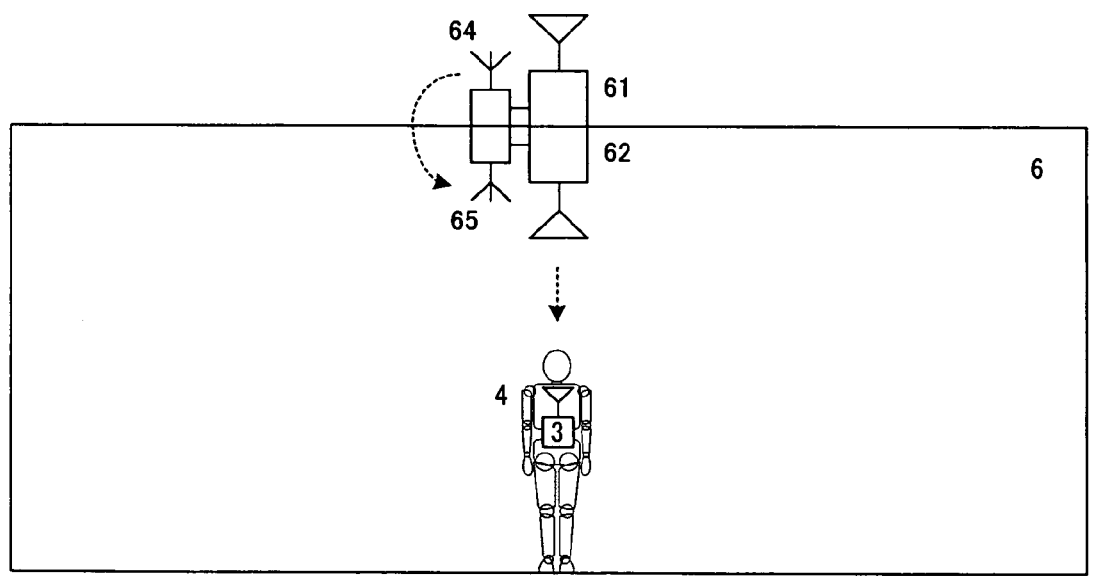
FIG. 11 shows the second mounting example such that components of the positioning signal transmission apparatus shown in FIG. 3 are separated to be mounted.

Namely, a radio transmission apparatus 64 is connected to the reception positioning block 61 and at the same time, a radio reception apparatus 65 is connected to the transmission block 62, as shown in FIG. 11. Then, the navigation message 24 that is outputted from the reception positioning block 61 and a signal that shows the positioned position 27 are inputted into the radio transmission apparatus 64 and the electromagnetic wave that is modulated by the signal is transmitted. This electromagnetic wave that is transmitted via a radio transmission path is received using the radio reception apparatus 65 and this wave is demodulated into the original signal. Then, a signal that shows the demodulated positioned position 27 and the navigation message 24 are supplied to the transmission block 62. Thus, an opening for penetrating the positioning signal transmission apparatus 2 need not be made in the ceiling of the building 6.

Meanwhile, it is preferable that the frequency of the electromagnetic wave that is transmitted from the radio transmission apparatus 64 and that is received at the radio reception apparatus 65 is significantly different from those of the GPS signal 10 and positioning signal 11. In this way, the influence of this electromagnetic wave on the position-positioning performed by the positioning apparatus 3 can be reduced. In addition, the attenuation of an electromagnetic wave can be reduce by the electromagnetic wave shield that is mounted to prevent the positioning signal 11 that is transmitted from the transmission antenna 8 from being received by the reception antenna 7.

When the reception antenna 7 is mounted far from the transmission antenna 8 like the above-mentioned example, it is preferable to adjust the transmission timing of the pseudo range code 29 in consideration of this position difference. In this way, the deterioration of the accuracy of the position-positioning using the positioning apparatus 3, which is caused by separately mounting the reception antenna 7 and the transmission antenna 8 can be reduced.

The present invention is not limited to the above-mentioned preferred embodiments and the various improvements/changes may be made without departing from the scope of the main purpose of the present invention.

For example, according to the configuration of the positioning signal transmission apparatus 2 as shown in FIG. 3, the transmission control unit 30 assigns a specified time difference to each of pseudo random noise codes 29 supplied from the signal generation unit 28. Then, the unit 30 supplies the assigned codes to the separate transmission high-frequency units 31 to be transmitted from the separate transmission antennas 8. Instead, the pseudo random noise codes 29 each of which is assigned a specified time difference are combined into one signal using the transmission control unit 30. After this, the combined signal is supplied to the transmission high-frequency unit 31 to be transmitted from the transmission antenna 8. In this way, the number of the transmission high-frequency units 31 and the transmission antennas 8 that are mounted on the positioning signal transmission apparatus 2 can be reduced.

What is claimed is:

1. An apparatus for transmitting a positioning signal, comprising:
    a reception unit for receiving a GPS signal transmitted from a satellite configuring a global positioning system (GPS);
    a signal generation unit for generating a plurality of positioning signals that are used for the positioning operation by a positioning apparatus for implementing a positioning operation based on the GPS signal and that are in a same form as that of the GPS signal;
    a transmission unit for transmitting the positioning signals; and
    a transmission control unit for controlling the transmission unit in such a way that assigns a time difference based on the GPS signal received by the reception unit to each positioning signal and transmits the assigned positioning signals.

2. The apparatus according to claim 1, wherein the signal generation unit generates at least three kinds of the positioning signals showing that transmission sources are different to each other.

3. The apparatus according to claim 1, wherein the signal generation unit generates the positioning signal based on a navigation message shown in the GPS signal received by the reception unit.

4. The apparatus according to claim 3, wherein the transmission control unit implements the control based on the navigation message shown in the GPS signal.

5. The apparatus according to claim 2, wherein the signal generation unit generates the positioning signal using pseudo random noise codes having different patterns.

6. The apparatus according to claim 1, wherein the transmission unit transmits the positioning signal including the navigation message shown in the GPS signal received by the reception unit.

7. The apparatus according to claim 1, wherein the reception unit is mounted in a position where the GPS signal preferably arrives in comparison with the positioning apparatus.

8. The apparatus according to claim 1, wherein the transmission unit directs a transmission direction of the positioning signal to have a directivity.

9. The apparatus according to claim 3, wherein the signal generation unit generates the positioning signal in a same form as a form of the GPS signal transmitted by the satellite that is present in the sky when the positioning signal is generated, which is shown by the navigation message.

10. The apparatus according to claim 1, wherein the transmission control unit implements the control so as to assign to each positioning signal a time difference according to a propagation time of the GPS signal from the satellite to the reception unit, thereby transmitting the assigned positioning signal.

11. The apparatus according to claim 10, wherein the transmission control unit calculates a propagation time of the GPS signal based on both a position of the satellite shown in a navigation message of the GPS signal and a position of the reception unit positioned based on the GPS signal.

12. The apparatus according to claim 10, wherein the transmission control unit calculates a propagation time of the GPS signal based on an altitude difference between a position of the reception unit and a position of a positioning apparatus for receiving a positioning signal transmitted by the transmission unit.

13. The apparatus according to claim 1, further comprising a detection unit for detecting an approach of a mobile body in a predetermined area, wherein
the transmission control unit controls the transmission unit in such a way that transmits the positioning signal according to a detection of the approach.

14. The apparatus according to claim 1, wherein:
the reception unit and the transmission unit are separately mounted; and
transmission of a signal from the reception unit to the transmission unit is implemented through a signal cable.

15. The apparatus according to claim 1, wherein:
the reception unit and the transmission unit are separately mounted; and
transmission of a signal from the reception unit.

16. The apparatus according to claim 3, wherein the signal transmission unit generates the positioning signal in a same form as a form of a GPS signal transmitted by the satellite that is present in the sky at a time of generation of the positioning signal, which is shown in the navigation message, and that cannot be used for a positioning operation in a position of the reception unit when generating the positioning signal.

17. The apparatus according to claim 1, wherein:
the transmission unit includes a transmission antenna for transmitting the positioning signal;
the reception unit includes a reception antenna for receiving the GPS signal;
the transmission antenna and the reception antenna are separately mounted; and
the transmission control unit implements the control based on a difference between a position where the transmission antenna is mounted and a position where the reception antenna is mounted.

18. A method of transmitting a positioning signal, comprising:
generating a plurality of positioning signals that are used for a positioning operation by a positioning apparatus for implementing a positioning operation based on a GPS signal transmitted from a satellite configuring a global positioning system (GPS) and that are in a same form as a form of the GPS signal; and
assigning a time difference based on the received GPS signal to each positioning signal, thereby transmitting the assigned positioning signals.

19. The positioning apparatus used in a positioning system including a positioning apparatus for implementing a positioning operation based on a GPS signal transmitted from a satellite configuring a global positioning system (GPS) and a positioning signal transmission apparatus for transmitting a positioning signal that is used for the positioning operation by the positioning apparatus and that is in a same form as a form of the GPS signal, wherein
the positioning signal transmission apparatus comprises:
a reception unit for receiving the GPS signal;
plurality of the positioning signals;
a transmission unit for transmitting the generated positioning signals by the signal generation unit; and
a transmission control unit controlling the transmission unit in such a way that assigns a time difference based on a GPS signal received by the reception unit to each positioning signal and transmits the assigned positioning signals,
the transmission unit transmits the positioning signal including a navigation message shown in the GPS signal received by the reception unit, and
the positioning apparatus comprises:
a signal reception unit for receiving a signal used for the positioning operation;
a determination unit for determining, based on the navigation message included in the signal, whether or not a signal received by the signal reception unit is transmitted by the positioning signal transmission apparatus; and
a notification unit for notifying the determination results.

20. The positioning apparatus according to claim 19, wherein
the signal generation unit generates the positioning signal in a same form as a form of the positioning signal transmitted by the satellite that is not present in the sky, which is shown in the navigation message; and
in the case where the signal reception unit receives the positioning signal in a same form as a form of the positioning transmitted by the satellite that is not present in the sky, which is shown in the navigation message, the determination unit determines that the positioning signal is transmitted by the positioning signal transmission apparatus.

21. An apparatus for transmitting a positioning signal, comprising:

reception means for receiving a GPS signal transmitted from a satellite configuring a global positioning system (GPS);

signal generation means for generating a plurality of positioning signals that are used for the positioning operation by a positioning apparatus for implementing a positioning operation based on the GPS signal and that are in a same form as that of the GPS signal;

transmission means for transmitting the positioning signals; and transmission control means for controlling the transmission means in such a way that assigns a time difference based on the GPS signal received by the reception means to each positioning signal and transmits the assigned positioning signals.

22. The positioning apparatus used in a positioning system including a positioning apparatus for implementing a positioning operation based on a GPS signal transmitted from a satellite configuring a global positioning system (GPS) and a positioning signal transmission apparatus for transmitting a positioning signal that is used for the positioning operation by the positioning apparatus and that is in a same form as a form of the GPS signal, wherein the positioning signal transmission apparatus comprises:
reception means for receiving the GPS signal;
signal generation means for generating a plurality of positioning signals;
transmission means for transmitting the generated positioning signals by the signal generation means; and
transmission control means for controlling the transmission means in such a way that assigns a time difference based on a GPS signal received by the reception means to each positioning signal and transmits the assigned positioning signals, the transmission means transmits the positioning signal including a navigation message shown in the GPS signal received by the reception means, and the positioning apparatus comprises:
signal reception means for receiving a signal used for the positioning operation;
determination means for determining, based on the navigation message included in the signal, whether or not a signal received by the signal reception means is transmitted by the positioning signal transmission apparatus; and
notification means for notifying the determination results.

23. An apparatus for transmitting a positioning signal, wherein the apparatus includes a code/signal processor to process code and signals, the code/signal processor comprising:

a signal generator to generate a plurality of positioning signals used to implement a positioning operation based on a received global positioning system (GPS) signal transmitted from a GPS satellite and, wherein the positioning signals are in a same form as a form of the GPS signal; and an assignment generator to assign a time difference based on the received GPS signal to each positioning signal to provide assigned positioning signals.

* * * * *

UNITED STATES PATENT AND TRADEMARK OFFICE
CERTIFICATE OF CORRECTION

| | | |
|---|---|---|
| PATENT NO. | : 7,023,382 B1 | Page 1 of 1 |
| APPLICATION NO. | : 11/014787 | |
| DATED | : April 4, 2006 | |
| INVENTOR(S) | : Hiroki Akano | |

It is certified that error appears in the above-identified patent and that said Letters Patent is hereby corrected as shown below:

Column 19    Line 64 (claim 15), delete "." and insert -- to the transmission unit is implemented through a radio transmission path.--.

Signed and Sealed this

Thirty-first Day of October, 2006

JON W. DUDAS
*Director of the United States Patent and Trademark Office*